United States Patent [19]

Matoba

[11] Patent Number: 5,420,633
[45] Date of Patent: May 30, 1995

[54] APPARATUS FOR SUPPRESSING PSEUDO-CONTOURS IN VIDEO SIGNALS

[75] Inventor: Kazuyuki Matoba, Kanagawa, Japan

[73] Assignee: Canon Kabushiki Kaisha, Tokyo, Japan

[21] Appl. No.: 901,239

[22] Filed: Jun. 19, 1992

[30] Foreign Application Priority Data

Jun. 24, 1991 [JP] Japan .................. 3-151280

[51] Int. Cl.⁶ ............................................. H04N 5/208
[52] U.S. Cl. ...................... 348/242; 348/253; 348/711
[58] Field of Search ............... 358/162, 166, 37; H04N 5/208; 348/630, 631, 627, 711, 912, 252, 253, 241, 242

[56] References Cited

U.S. PATENT DOCUMENTS

| 4,090,221 | 5/1978 | Connor | 358/166 |
| 4,591,899 | 5/1986 | Hashimoto | 348/711 |
| 4,651,196 | 3/1987 | Harwood et al. | 348/711 X |
| 4,991,021 | 2/1991 | Nikoh et al. | 358/162 |
| 5,153,727 | 10/1992 | Choi | 358/162 |

FOREIGN PATENT DOCUMENTS

| 1-94768 | 4/1989 | Japan | H04N 5/208 |
| 2-285779 | 11/1990 | Japan | H04N 5/208 |
| 3-82275 | 4/1991 | Japan | H04N 5/21 |

OTHER PUBLICATIONS

Translation of Japan 2-285779.

Primary Examiner—Mark R. Powell
Attorney, Agent, or Firm—Robin, Blecker, Daley & Driscoll

[57] ABSTRACT

An image signal processing device includes a luminance information detecting circuit which detects luminance information on an object and a filter circuit to which an image signal is supplied from an image sensing system. The filtering characteristic of the filter circuit is arranged to be switched from one characteristic over to another according to the detection output of the luminance information detecting circuit, so that the generation of a pseudo-contour can be prevented.

22 Claims, 4 Drawing Sheets

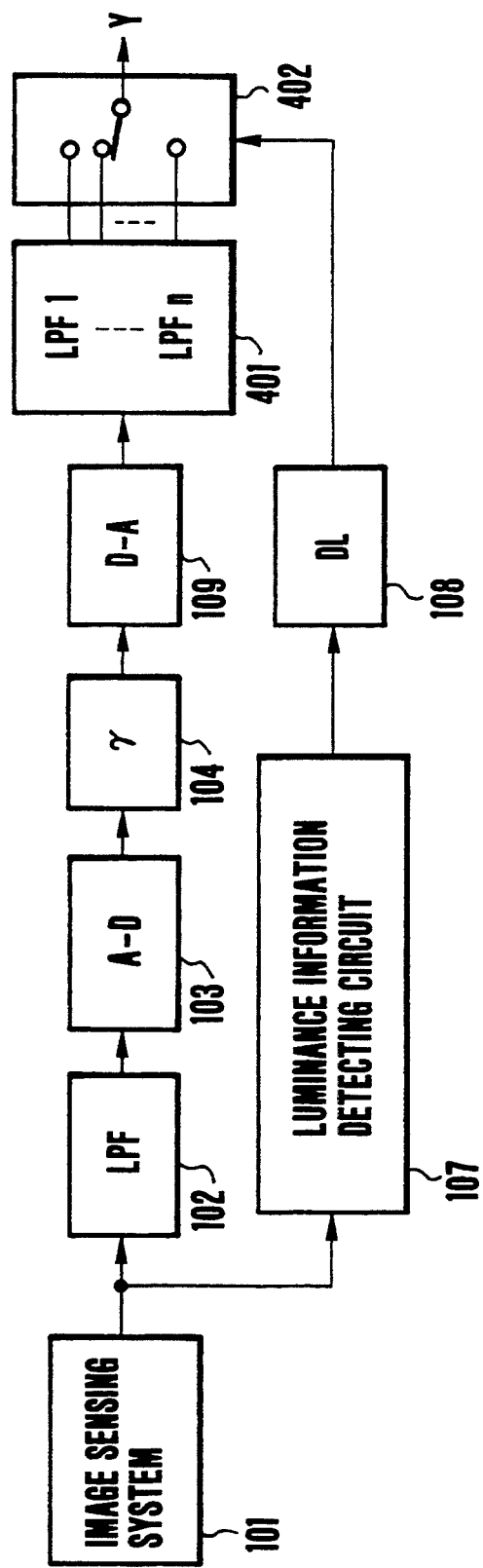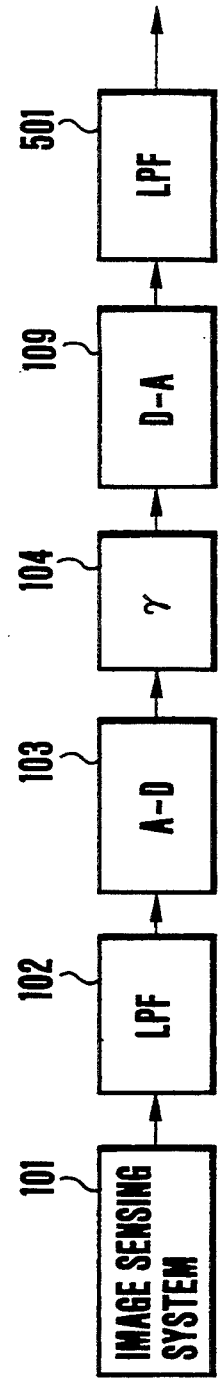

APPARATUS FOR SUPPRESSING PSEUDO-CONTOURS IN VIDEO SIGNALS

BACKGROUND OF THE INVENTION

Field of the Invention

This invention relates to an image signal processing device arranged to suppress the generation of a pseudo-contour in processing an image signal through analog-to-digital conversion in a video motion-picture camera, an electronic still camera or the like, and particularly the generation of a pseudo-contour resulting from a gamma correction process which is performed after the analog-to-digital conversion.

Description of the Related Art

In performing a signal processing action through analog-to-digital conversion (hereinafter referred to as A-D conversion) on an image signal obtained from an image sensing system, it has been practiced to use an arrangement which is, for example, as shown in FIG. 5.

Referring to FIG. 5, with a CCD solid-state image sensor employed as the image sensor of an image sensing system 101, for example, an image signal is obtained at an output terminal of the image sensing system 101 through a correlated double sampling circuit and an automatic gain adjustment circuit which are not shown.

Next, a low-pass filter (LPF) 102 is arranged to limit the band of a frequency component of the image signal exceeding the Nyquist frequency of an A-D conversion clock signal for the purpose of preventing an aliasing distortion from being caused by subsequent A-D conversion. The A-D conversion is performed by an A-D converter 103.

The image signal which is thus digitized is supplied to a gamma correction circuit 104 to adjust the image signal to the gamma characteristic of an image receiver. After the gamma correction, the signal is supplied to a D-A converter 109 to be subjected to digital-to-analog (hereinafter referred to as D-A) conversion. After the D-A conversion, an LPF circuit 501 imposes limitations on the band of the image signal in the vertical and horizontal directions and outputs the signal as a luminance signal Y.

However, with a digital signal processing action performed by an arrangement such as that shown in FIG. 5, a phenomenon which gives a so-called pseudo-contour takes place to conspicuously degrade the image quality. The pseudo-contour appears in a reproduced image showing as if there is a contour part in an image part where, in actuality, luminance is smoothly changing.

The pseudo-contour is described with reference to FIG. 6 as follows:

in FIG. 6, a part (ii) shows, in an analog form, the output signal (a full line) of the A-D converter 103 shown in FIG. 5.

A signal (A) is obtained by A-D converting a signal (i) whose level is quickly changing.

A signal (B) is obtained by A-D converting a signal (i) whose level is gradually changing.

In actuality, the output signal (ii) (a full line) of the A-D converter 103 is gamma-corrected by the gamma correction circuit 104. Therefore, in the case of a low luminance level as indicated by a full line in FIG. 6, if the gamma characteristic of a lower luminance part (from a point "0" to a point "a") is approximately three times as shown in FIG. 7, the signal is expanded about three times as shown at a part (iii) of FIG. 6 when the signal is outputted from the output terminal of the gamma correction circuit 104. The output signal of the gamma correction circuit 104 is D-A converted by the D-A converter 109. The analog signal thus obtained is band-limited by the LPF 501 and outputted from the LPF 501. In this case, if the signal (i) before A-D conversion is steeply changing as shown at the part (A) of FIG. 6, the output of the LPF 501 can be obtained in the same shape as the signal before A-D conversion without being affected by the gamma correction irrespectively of its luminance level, as shown by a broken line in the part (iii). However, in a case where the signal (i) before A-D conversion is gradually changing as shown at the part (B) of FIG. 6, if its luminance level is low, the output of the LPF 501 comes to show some edges that do not really exist. According to the results of tests conducted by the inventor of the present invention, a pseudo-contour tends to be generated for such a signal that gradually changes its luminance level about 2 LSBs within the range of about to 17 LSBs, with the luminance level before gamma correction assumed to be at an amplitude of 8 bits.

SUMMARY OF THE INVENTION

In view of the above-stated problem, it is a principal object of this invention to provide an image signal processing device which is capable of suppressing the generation of a pseudo-contour.

To attain this object, an image signal processing device arranged as an embodiment of the invention comprises: luminance information detecting means for detecting luminance information; and low-pass filter means arranged to vary its characteristic according to an output of the luminance information detecting means.

Other objects and advantages of the invention will become apparent from the following detailed description of embodiments thereof taken in conjunction with the accompanying drawings.

BRIEF DESCRIPTION OF THE DRAWINGS

FIG. 4 is a block diagram showing an image sensing device of a third embodiment of the invention.

FIG. 5 is a block diagram showing by way of example a conventional image sensing device.

DETAILED DESCRIPTION OF THE PREFERRED EMBODIMENTS

Figure 1:
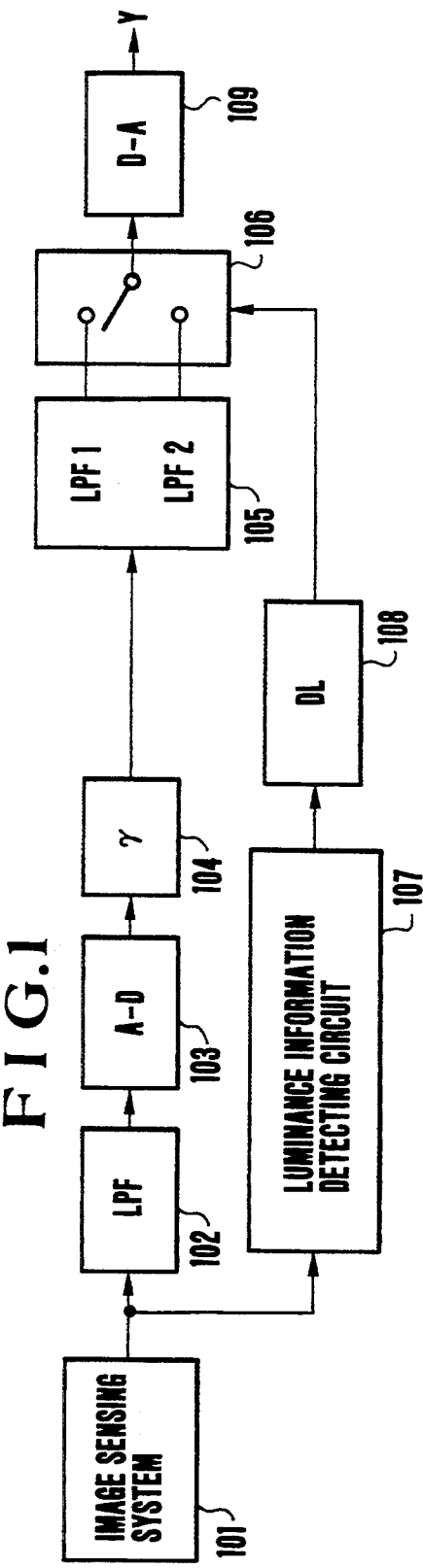
FIG. 1 is a block diagram showing an image sensing device of a first embodiment of the invention.

FIG. 1 shows in a block diagram an image sensing device which is arranged according to the invention as a first embodiment thereof. Referring to FIG. 1, an image sensing system 101 is composed of a lens, an image sensor, a noise removing circuit, a gain control circuit and so on. A low-pass filter 102 is provided for removal of an aliasing distortion resulting from A-D conversion. The image sensing device further comprises an A-D converter 103; a gamma correction circuit 104;

a low-pass filter (LPF) group 105 including LPFs which are of different characteristics; A switch 106 which is provided for the purpose of selectively outputting the outputs of the LPF group 105; a luminance information detecting circuit 107 which is arranged to detect a signal level, a contour component, etc.; a delay circuit 108 which is provided for adjustment of a time difference between a digital signal obtained after A–D conversion and a luminance information detection signal which is in an analog form; and a D–A converter 109 which is arranged to D–A convert the signal selected by the switch 106 and to output the signal thus converted.

The signal outputted from the image sensing system 101 is band-limited by the LPF 102 for removal of any aliasing distortion resulting from A–D conversion. The band-limited signal is converted into a digital signal by the A–D converter 103. The digital signal outputted from the A–D converter 103 is supplied to the gamma correction circuit 104 to be gamma-corrected according to an amount of correction written and stored in a ROM or the like. After the gamma correction, the signal is supplied to the LPF (low-pass filter) group 105. The LPF group 105 then outputs signals obtained through band-limiting processes performed with different characteristics. These output signals of the LPF group 105 are supplied to the selection terminals of the switch 106.

Figure 2:
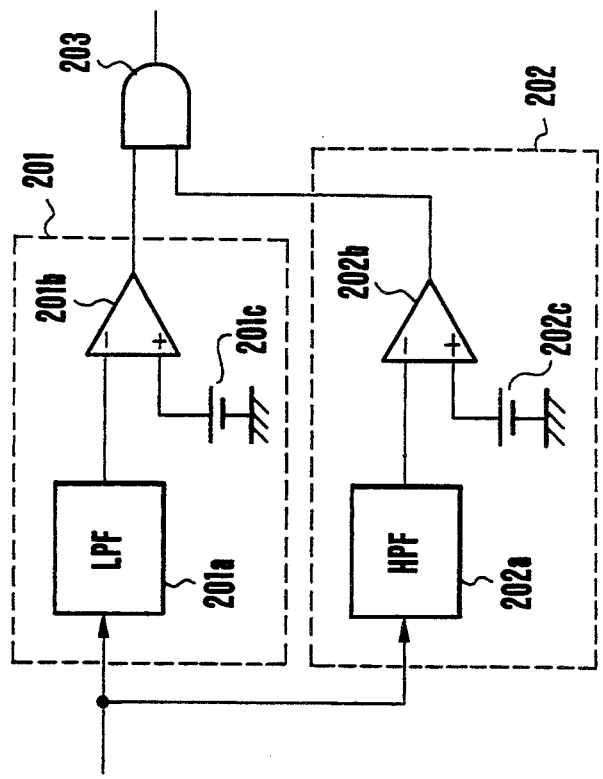
FIG. 2 is a block diagram showing a luminance information detecting circuit in the first embodiment.
Figure 7:
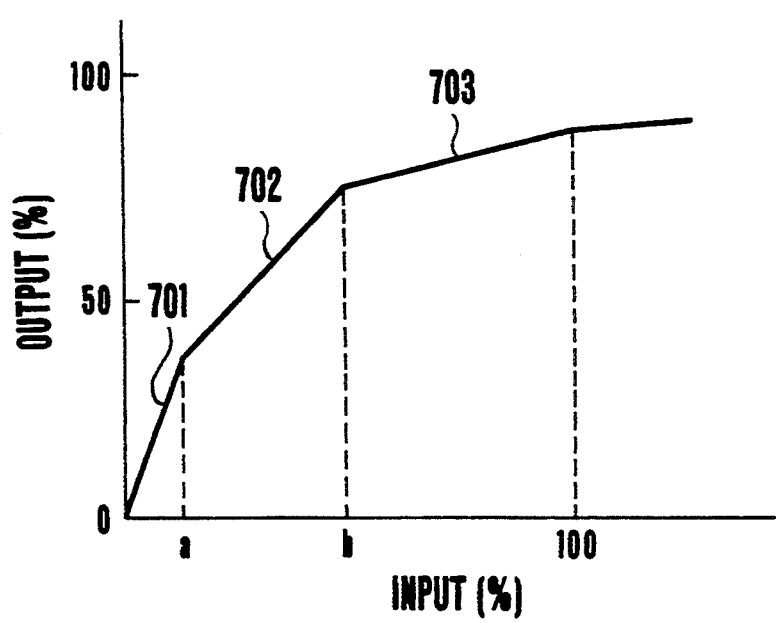
FIG. 7 shows an example of gamma correction.

The output signal of the image sensing system 101 is supplied also to the luminance information detecting circuit 107 separately from the above-stated signal processing route (hereinafter referred to as the main line). The luminance information detecting circuit 107 is arranged as shown in FIG. 2 to detect the level of luminance and a contour component. More specifically, in a block 201, a band-limiting action is suitably performed by an LPF 201a. Then, a comparator 201b makes a comparison in luminance level by using, as a threshold value, a reference voltage which is set at a reference voltage source 201c, so that a predetermined luminance level can be detected. The provision of the comparator 201b and the reference voltage source 201c respectively in plural numbers enables the luminance information detecting circuit 107 to detect a plurality of luminance level ranges defined by points "a" and "b" shown in FIG. 7. In the case of the first embodiment, however, the luminance information detecting circuit 107 is arranged to detect luminance levels below the point "a" shown in FIG. 7. In another block 202 of FIG. 2, a high-pass filter (HPF) 202a is arranged to extract a high-frequency component. Then, with a reference voltage which is set at a reference voltage source 202c used as a threshold value, a contour component is detected by a comparator 202b. As mentioned in the foregoing, a pseudo-contour is conspicuous at a part where the signal level gradually changes within a low luminance level range. Therefore, the luminance level detection signal of the block 201 and the contour detection signal of the block 202 are outputted as a luminance information detection signal through a gate circuit 203 (an AND circuit in this instance). The luminance information detection signal is supplied to the delay circuit 108 to be time-adjusted to the digital signal obtained on the side of the main line. After the time adjustment, the luminance information detection signal is outputted from the delay circuit 108 to the switch 106 as a control signal for selection of one of the selection terminals of the switch 106.

In the case of the first embodiment described above, with the luminance information detecting circuit 107 arranged as shown in FIG. 2, the low-pass filter (LPF) group 105 is composed of the LPF 1 and the LPF 2. The LPF 1 is arranged to strongly (at a low frequency) set a band limit to a signal which is of a low luminance level and whose level is gradually changing. The LPF 2 is arranged to moderately set a band limit to a high luminance level or to an edge part. The switch 106 is arranged to selectively output either the signal of the LPF 1 or the signal of the LPF 2 in accordance with the control signal from the luminance information detecting circuit 107. Therefore, a luminance signal can be obtained at the output terminal of the D–A converter 109 in a state of having any pseudo-contour effectively suppressed.

In the case of the first embodiment, the luminance information is detected from the analog signal before A–D conversion. However, this may be changed to digitally detect the luminance information from the signal after A–D conversion. However, the arrangement to detect the luminance information from the A–D converted signal might detect a pseudo-contour resulting from a quantization error of A–D conversion for the flat part of the signal. Therefore, in the case of this embodiment, the luminance information is arranged to be detected from the analog signal before A–D conversion. Further, the luminance information detecting circuit 107 may be arranged to detect either the luminance level or a pseudo-contour component according to the circuit arrangement, etc., of the main line.

Figure 3:
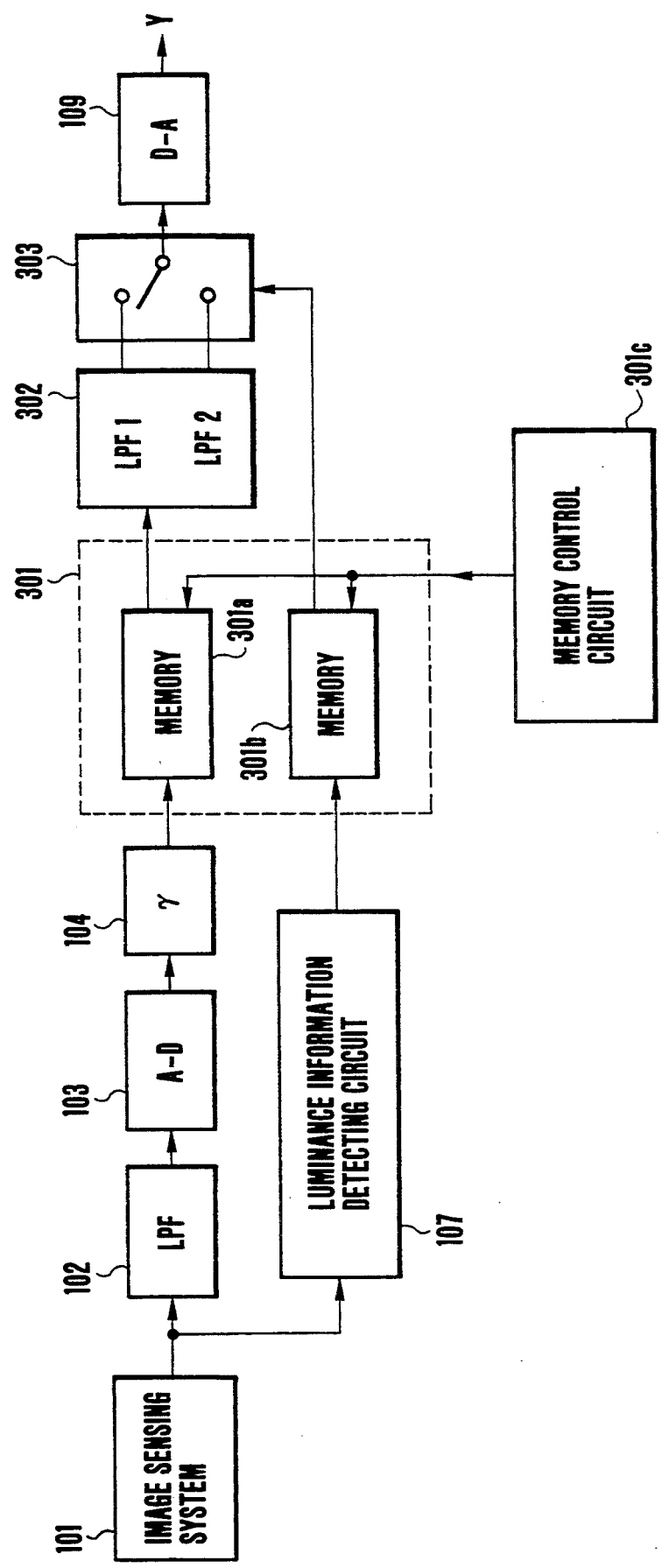
FIG. 3 is a block diagram showing an image sensing device of a second embodiment of the invention
Figure 6:
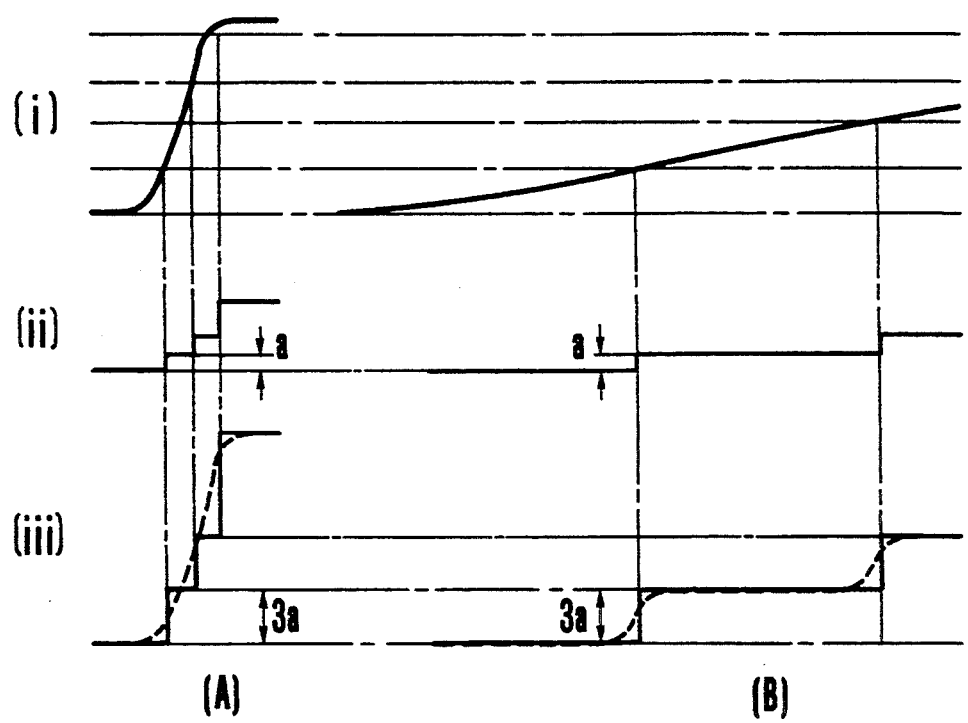
FIG. 6 is an illustration for explaining the pseudo-contour.

Another image sensing device which is arranged in accordance with the invention as a second embodiment thereof is described as follows: the first embodiment is arranged to adjust a time difference between the luminance information detection signal and the main line signal in an analog manner. In the case of the second embodiment, however, a memory is used for more accurately adjusting the time difference. Since the circuit action of the second embodiment is identical with that of the first embodiment, the following describes only the memory part of the second embodiment with reference to FIG. 3:

Referring to FIG. 3, a gamma-corrected signal which is obtained in the same manner as in the case of the first embodiment is written into a memory 301a. Meanwhile a luminance information detection signal is written into another memory 301b. In this instance, a single memory control circuit 301c is used to cause the luminance information detection signal to be written in the memory 301b at the same address as the luminance signal written in the memory 301a. The use of the memory control circuit 301c obviates the necessity of the time difference adjustment. It is also possible to process the luminance information detection signal by adding one bit to the luminance signal by using the same memory.

An image sensing device arranged in accordance with the invention as a third embodiment thereof is described as follows: while the low-pass filter group of the first embodiment is digitally arranged, the low-pass filter group may be arranged in an analog manner. The third embodiment is one example of the latter arrangement. In order to strongly impose a band limit, the digital arrangement necessitates an increase in the number of taps of the delay circuit, which results in a larger circuit scale. To solve this problem, in the case of the third embodiment, a low-pass filter (LPF) group 401 is provided for an analog signal obtained after D–A conversion, as shown in FIG. 4. Then, the outputs of the LPF group 401 are selectively outputted through a switch 402 according to the luminance information detection signal.

Further, in each of the embodiments described above, the low-pass filter group is arranged to be switched from one LPF over to another on the side of output. However, the invention is not limited to this arrangement. This arrangement may be changed either to perform the switching action on the side of input or to select one of taps provided within the circuit. Further, the invention can be put into practice also by replacing the hardware low-pass filter group with low-pass filter means which is arranged to perform a software arithmetic operation. In that instance, the low-pass filter characteristic is arranged to be variable by changing the parameters.

Further, each embodiment described is arranged to suppress the generation of a pseudo-contour which results from the gamma correction. However, the invention is not limited to such arrangement. The invention is applicable also to a case where the generation of such a pseudo-contour that results from a shortage of the total number of bits for quantization is to be suppressed.

As described above, pseudo-contours resulting from various causes can be suppressed in accordance with the invention.

In other words, the foregoing description of embodiments has been given for illustrative purposes only and not to be construed as imposing any limitation in every respect. The scope of the invention is, therefore, to be determined solely by the following claims and not limited by the text of the specifications, and alterations made within a scope equivalent to the scope of the claims fall within the true spirit and scope of the invention.

What is claimed is:

1. An image sensing device comprising:
   a) luminance detecting means for detecting luminance information on an object;
   b) image sensing means arranged to photoelectrically convert image light coming from the object; and
   c) low-pass filter means arranged to receive an output signal of said image sensing means and to have a filtering frequency characteristic which is variably set according to an output signal of said luminance detecting means.

2. A device according to claim 1, wherein said low-pass filter means includes a plurality of filter circuits and a switch circuit arranged to selectively output one of output signals of said filter circuits, said switch circuit being arranged to have its selecting position changed from one position over to another by the output signal of said luminance detecting means.

3. A device according to claim 1, wherein said image sensing means includes a CCD and an A-D converter arranged to convert an output of said CCD into a digital signal.

4. A device according to claim 1, wherein said luminance information includes the brightness of an object and/or the amount of a contour component.

5. A device according to claim 1, wherein said low-pass filter means includes a digital filter.

6. A device according to claim 2, wherein said filter circuits include a filter circuit arranged to perform a band limiting action on a low-frequency component which is of a low level and whose level is gradually changing.

7. An image pickup apparatus comprising:
   (a) image pickup means for converting an optical image into an electrical signal;
   (b) filter means for cutting off a high frequency component of said electrical signal; and
   (c) control means for changing frequency characteristics of said filter means in accordance with a luminance level of said electrical signal.

8. An apparatus according to claim 7, wherein said control means lowers a cut off frequency of said filter means when said luminance level is lower than a predetermined level.

9. An apparatus according to claim 7, wherein said control means includes a luminance level detector.

10. An apparatus according to claim 7, further comprising an A-D converter to convert said electrical signal into a digital signal.

11. An apparatus according to claim 10, wherein said control means includes a luminance level detector for detecting a luminance level of an output of said image pickup means before conversion of said output by said A-D converter.

12. An apparatus according to claim 7, further comprising contour detecting means for detecting the level of contour of said electrical signal.

13. An apparatus according to claim 12, wherein said control means changes frequency characteristics in accordance with the level of the contour of said electrical signal.

14. An apparatus according to claim 13, wherein said control means lowers a cut-off frequency of said filter means when the level of the contour of said electrical signal is lower than a predetermined level.

15. An image pickup apparatus comprising:
   (a) image pickup means for converting an optical image into an electrical signal;
   (b) filter means for cutting off a high frequency component of said electrical signal; and
   (c) control means for changing frequency characteristics of said filter means in accordance with a contour level of said electrical signal.

16. An apparatus according to claim 15, wherein said control means lowers a cut-off frequency of said filter means when the level of the contour of said electrical signal is lower than a predetermined level.

17. An apparatus according to claim 15, wherein said control means changes frequency characteristics of said filter means in accordance with a luminance level of said electrical signal.

18. An apparatus according to claim 17, wherein said control means lowers a cut-off frequency of said filter means when said luminance level is lower than a predetermined level.

19. An apparatus according to claim 18, further comprising an A-D converter to convert said electrical signal into a digital signal.

20. An apparatus according to claim 19, wherein said control means includes a luminance level detector for detecting a luminance level of an output of said image pickup means before conversion of said output by said A-D converter.

21. An apparatus according to claim 15, further comprising an A-D converter to convert said electrical signal into a digital signal.

22. An apparatus according to claim 21, wherein said control means includes a contour level detector for detecting a contour level of an output of said image pickup means before conversion of said output by said A-D converter.

* * * * *